United States Patent
Meyer

[15] 3,659,800
[45] May 2, 1972

[54] SEAT BELT RETRACTOR

[72] Inventor: Barthold F. Meyer, Mt. Clemens, Mich.

[73] Assignee: General Motors Corporation, Detroit, Mich.

[22] Filed: June 29, 1970

[21] Appl. No.: 50,564

[52] U.S. Cl. ..................................................242/107.4
[51] Int. Cl. ..................................................A62b 35/00
[58] Field of Search............242/107 R, 107 SB, 107.4, 107.5, 242/107.6, 107.7; 297/388; 280/150 SB

[56] References Cited

UNITED STATES PATENTS

| | | | |
|---|---|---|---|
| 3,343,765 | 9/1967 | Baker | 242/107.4 |
| 2,370,921 | 3/1945 | Sharpe | 242/107.4 X |
| 3,074,761 | 1/1963 | Ryan | 242/107.4 X |
| 3,190,579 | 6/1965 | Spouge | 242/107.4 |
| 3,237,879 | 3/1966 | Whittingham | 242/107.4 |
| 3,273,822 | 9/1966 | Merrell et al. | 242/107.4 |

Primary Examiner—Stanley N. Gilreath
Assistant Examiner—Werner H. Schroeder
Attorney—W. E. Finken and Herbert Furman

[57] ABSTRACT

A seat belt retractor includes a U-shaped support having generally vertically disposed closed end slots in the side walls thereof. A reel having ratchet toothed end plates and a shaft mounts a seat belt. The ends of the shaft are received within the slots and torsion springs bias the shaft ends into engagement with the lower ends of the slots. The reel is spring biased in a belt retracting direction. A pawl is movable mounted on the side walls of the frame and normally located against movement by a columnar spring. Cooperating cam surfaces on the pawl and side walls move the pawl laterally of and into engagement with the ratchet plates of the reel when the pawl moves laterally of the side walls or longitudinally of the reel. When belt acceleration or movement of the belt in an extending direction exceeds a predetermined rate, the reel moves bodily upwardly with respect to the frame as the shaft ends move within the slots, and the ratchet plates of the reel engage cooperating teeth on the side walls of the frame to block further rotation of the reel in a belt extending direction. When the pawl is subjected to an acceleration pulse of predetermined amplitude and time longitudinally thereof and generally normal to the direction of bodily movement of the reel, the pawl moves laterally of the side walls and into engagement with the ratchet plates of the reel to provide a fulcrum for movement of the reel bodily upwardly so that the ratchet plates of the reel again engage the cooperating teeth on the side walls of the frame. When the pulse is laterally of the pawl, it also moves into engagement with the ratchet plates to provide the same fulcrum.

8 Claims, 6 Drawing Figures

Patented May 2, 1972

3,659,800

INVENTOR.
Barthold F. Meyer
BY
Herbert Furman
ATTORNEY

SEAT BELT RETRACTOR

This invention relates to seat belt retractors and more particularly to seat belt retractors of the inertia type.

One of the features of this invention is that the retractor is responsive to both belt acceleration forces as well as acceleration pulses applied to the retractor. In either instance, a normally extendible and retractable seat belt is held against further movement in an extending direction.

Another feature of this invention is that the retractor includes a reel mounted on a support for both rotational and bodily shifting movement relative thereto, with the reel being normally rotatable relative to the support to permit free movement of the belt in extending and retracting directions, and with the reel being bodily movable relative to the support through a predetermined distance to blocked position wherein the reel is blocked from rotational movement in a belt extending direction. The bodily movement of the reel relative to the support may result solely form belt acceleration forces or movement of the belt in an extending direction at a rate greater than a predetermined rate. It may also result from a pawl mounted on the support and subject to acceleration pulses. The pawl is operative, when a pulse of predetermined amplitude and time is received, to block rotational movement of the reel and act as a fulcrum for bodily movement of the reel through the predetermined distance to blocked position.

A further feature of this invention is that the pawl is normally located out of engagement with toothed end plates of the reel by locating means which positions the pawl both laterally and longitudinally of the reel, with the pawl and support including cooperating means for moving the pawl into engagement with the toothed end plates of the reel when the pawl moves longitudinally of the reel under an acceleration pulse sufficient to overcome the effect of the locating means.

These and other features of the retractor of this invention will be readily apparent from the following specification and drawings wherein.

Figure 1:
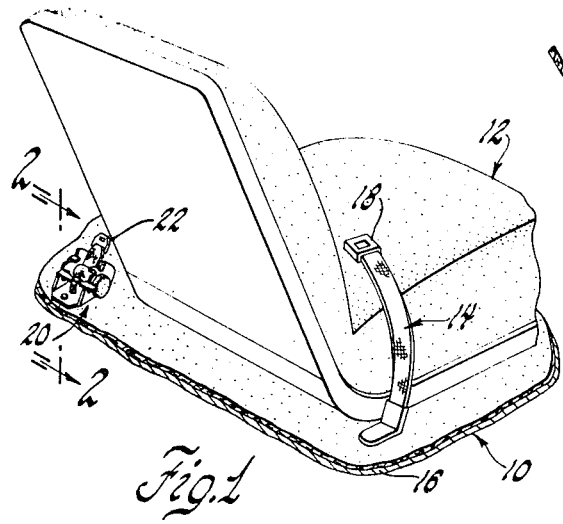
FIG. 1 is a partial perspective view of a vehicle body having a seat mounted thereon and a lap belt assembly provided for the occupant of the seat, with the outboard belt being provided with a retractor according to this invention.

Referring now particularly to FIG. 1 of the drawings, a vehicle designated generally 10 includes a seat 12 conventionally mounted thereon. The seat 12 is provided with a lap belt assembly which includes an inboard belt 14 of fixed length and having one end thereof conventionally anchored to the floor pan 16 of the vehicle and the other end thereof provided with a conventional push button buckle 18. The outboard belt 22 is mounted on the vehicle by a retractor 20 according to this invention, for movement between a fully retracted position as shown and an extended position, not shown, wherein the outboard belt D-ring is latchingly engaged with the buckle 18 of the inboard belt to provide a lap belt for a seated occupant.

Figure 2:
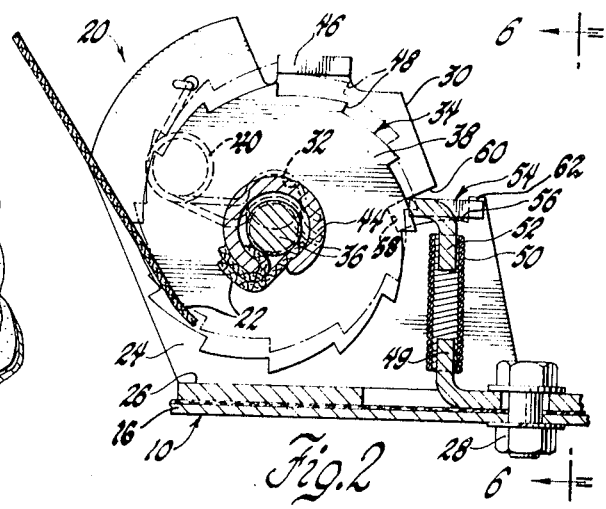
FIG. 2 is an enlarged view of a portion of FIG. 1 showing the retractor in normal position in full lines wherein the reel is freely movable in both belt extending and retracting directions and showing the reel in dotted lines in a blocked position wherein the reel is blocked against further movement in a belt extending direction.
Figure 5:
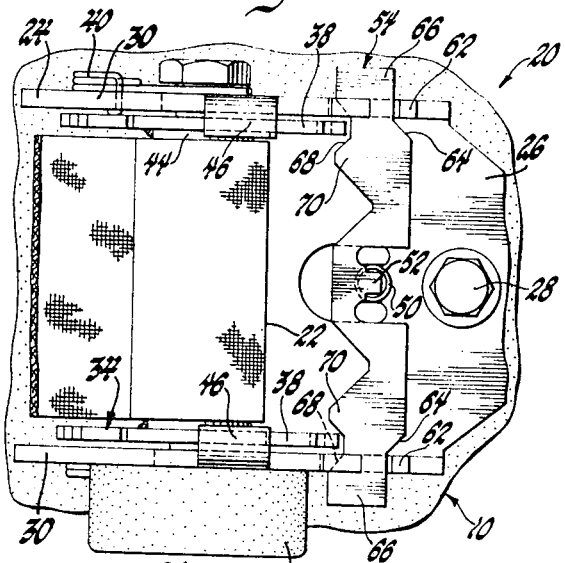
FIG. 5 is a plan view of the retractor in normal position.
Figure 6:
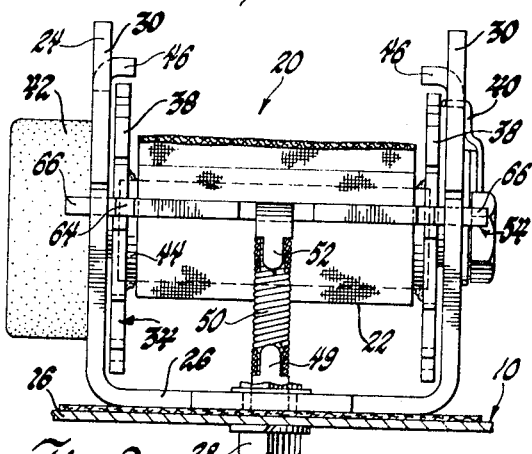
FIG. 6 is a view taken generally along the plane indicated by line 6—6 of FIG. 2.

Referring now particularly to FIGS. 2, 5 and 6 of the drawings, the retractor 20 includes a generally U-shaped support or frame 24 having a base wall 26 bolted at 28 to the floor pan 16 of the vehicle 10 and a pair of generally parallel spaced side plates or walls 30 extending laterally of the base plate. The side walls 30 are each provided with an elongated generally double-D shaped closed end slot 32, such slots being aligned longitudinally of the frame 24.

A reel designated generally 34 includes a shaft 36 and a pair of toothed end plates or ratchet plates 38 fixedly secured to the shaft 36. The ends of the shaft 36 extend beyond the ratchet plates 38 and are freely rotatably and movably received within respective slots 32. A coil torsion spring 40 has one end anchored in an aperture in each of the walls 30 and the other end thereof suitably shaped for engagement with a respective end of the shaft 36 to thereby locate the ends of shaft 36 in engagement with the lower ends of slots 32 and locate the reel 34 in what may be termed a normal operating position, as shown in full lines in FIG. 2. As shown in FIG. 5 and 6, a circular housing 42 is conventionally mounted on one side wall 30 and houses a conventional clock spring, not shown, having one end thereof slidably anchored to the housing and the other end thereof suitably anchored to one end of the shaft 36 to bias the reel 34 in a belt retracting direction or counterclockwise, as viewed in FIG. 2, 3, and 4. The spring moves with reel 34 relative to frame 24. The belt 20 has its inner end looped over the shaft 36, as shown, and retained in place by a C-clip 44 extending between the ratchet plates 38. The spring housed in housing 42 continually biases the reel 34 in counterclockwise or belt retracting direction as previously described to normally maintain the belt 22 in a fully retracted position, as shown in FIG. 1. It can be seen that the reel 34 is normally free to rotate in both counterclockwise and clockwise directions, respectively belt retracting and belt extending directions, and permit free movement of the seated passenger relative to the seat.

The side walls 30 of the frame 24 are each provided with a laterally inwardly extending tab or tooth 46 which extend toward each other and are located in predetermined spaced relationship to the lower ends of the slots 32. Should the belt 22 be extended at a rate exceeding a predetermined rate due to movement of the seated passenger, the reel 34 will shift upwardly from its full line normal position shown in FIG. 2 to its dot-dash blocked position as shown therein as the ends of shaft 36 move upwardly within slots 32 against the action of springs 40, which function as threshold springs. As the reel moves upwardly, a pair of aligned teeth 48 of the plates 38 of the reel will engage a respective tooth 46 to thereby block any further rotation of the reel in a counterclockwise or belt extending direction. The rate of belt extension required to move the reel 34 upwardly is predetermined and is set so that the reel will not move upwardly unless the seated and belted passenger shifts forwardly of the vehicle or to the right, as viewed in FIG. 1, at a certain rate, such as would occur in the event of a sudden stop or impact of the vehicle. Thus the reel 34 is subject to acceleration forces applied to the belt 22 and the application of such forces at a predetermined rate blocks extension of the belt. Upon cessation or reduction of such rate of acceleration of the belt 22, the springs 40 will immediately return the reel 34 to its full line or normal position, shown in FIG. 2, to again permit free extension of the belt.

Figure 3:
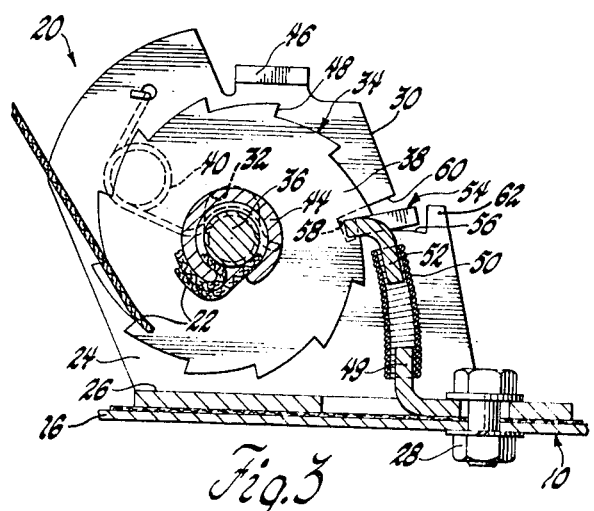
FIG. 3 is a view showing the pawl in engagement with the ratchet plates of the reel when subjected to an acceleration pulse of predetermined amplitude and time to provide a fulcrum for the reel.

The base wall 26 of frame 24 is provided with an upwardly extending lanced tab 49 which is received within the lower end of a coil columnar type spring 50. The upper end of this spring receives a downwardly extending tab 52 of a pawl designated generally 54. As shown in FIGS. 3 and 5, the side walls 30 of the frame are each provided with an opening having a slightly arcuate base edge 56 joined to an angularly extending side edge 58 which in turn joins to an upper edge 60 extending normally to edge 58 and angularly of edge 56. The rearward edge of the opening is defined by an upwardly extending tab or cam 62. The pawl 54 normally seats on the edges 56, as shown in FIG. 2, and the trailing edge thereof includes angularly extending edges or cams 64, FIG. 5, each respective to a cam 62 and normally located immediately adjacent to and inboard thereof. The spring 50 normally biases the pawl 54 slightly to the right, as viewed in FIGS. 2, 3, and 4, to maintain guide edges 66 of the pawl in engagement with the cams 62 and thereby locate cams 64 relative to the respective cams 62.

The leading edge of the pawl 54 includes a pair of spaced notches 68 which normally receive the ratchet plates 38 of reel 34, as shown in FIG. 5, and each of which includes a tooth 70 defining the inboard side edge thereof and respective to a ratchet plate 38.

Figure 4:
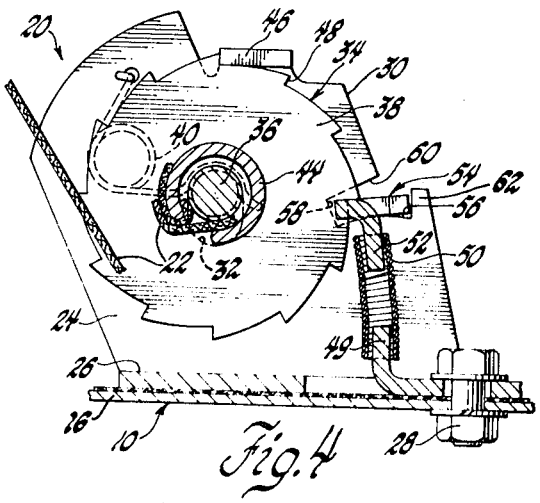
FIG. 4 is a view showing the reel moving about the fulcrum provided by the pawl to blocked position.

Normally, as shown in FIG. 5, the notches 68 permit free extension and retraction of the belt, or free movement of the reel 34 in both clockwise and counterclockwise directions, as viewed in FIGS. 2, 3, and 4. The force of the spring 50 is sufficient to normally locate the pawl as shown in FIG. 5 and resist any movement thereof laterally or longitudinally of the retractor so that the guide edges 66 normally engage cams 62, although there is some slight movement between the guide edges and cams as the pawl moves relative to the support due to road shocks and other pulses being applied to the vehicle.

Should the vehicle receive an acceleration pulse of predetermined amplitude and time which is applied generally longitudinally of the pawl and normal to the direction of bodily movement of the reel, the pawl 54 will thereupon move laterally of the edges 56 of walls 30 or axially of the reel 34. The direction of movement of the pawl will, of course, depend on the direction of the pulse. As the pawl 54 moves laterally, one of the cams 64 will engage a corresponding cam 62 to shift the pawl 54 radially of the reel 34 so that one tooth 70 will thereupon move into engagement with one tooth of a respective ratchet plate 38, as shown in FIG. 3. The other tooth 70 will, of course, be inboard of its respective ratchet plate 38. However, the portion of the pawl 54 defining the outboard edge of the other notch 68 will engage a tooth of such respective ratchet plate 38 and function as a tooth. Thus, both ratchet plates 38 will have axially aligned teeth thereof engaged by pawl 54 to block rotation of the reel 34 clockwise or in a belt extending direction. Should the occupant thereupon exert any force against the lap belt tending to extend the belt, the pawl 54 acts as a fulcrum for the reel 34 and the reel will thereupon move bodily upwardly of the retractor about this fulcrum from its FIG. 3 position to its FIG. 4 position so that axially aligned teeth of the ratchet plates 38 again engage teeth 46 of the side walls of the frame to again block the reel against movement in an extending direction. Should the vehicle receive an acceleration pulse of predetermined amplitude and time which is applied generally laterally of the pawl and normal to the direction of bodily movement of the reel, the pawl 54 will thereupon move radially of the reel 34 so that the portions of the pawl defined by the base edges of the notches 68 will engage axially aligned teeth of the reel 34 and again provide a fulcrum for bodily movement of the reel upwardly of the frame to blocked position. The direction of the pulse must, of course, be opposite to the direction of movement of the pawl. If the pulse is angularly of the pawl, then the pawl can move both axially and radially of the reel 34. Likewise, the pulse need not be coplanar with a plane normal to the direction of bodily movement of the reel 34, but if the angle of the pulse exceeds a predetermined angle with respect to such plane, the pawl 54 may not move in the desired direction relative to the reel 34.

The arcuate base edges 56 of the openings in the frame side walls reduce the area of engagement between the pawl and such edges to permit movement of the pawl with minor friction losses in the event of a pulse of predetermined amplitude and time being received by the vehicle and then transmitted to the retractor. Further, the shape of these edges in combination with their respective edges 58 and 60 permits the pawl to tilt angularly from the horizontal, as shown in FIGS. 3 and 4, when engaged with the ratchet plates 38 for easier fulcruming of the reel upwardly of the frame to blocked position. As shown in FIG. 3, the initial engagement of the pawl with the ratchet plates 38 of the reel bends the spring 50 slightly toward the axis of rotation of the reel. However, this initial engagement of the pawl with the reel provides a fulcrum for subsequent movement of the reel 34 upwardly of the frame 24 should the passenger apply force to the belt in an extending direction.

The acceleration pulse necessary to move the pawl 54 axially of the reel need not be received in a direction exactly parallel to the axis of rotation of the reel since a pulse directed angularly to such axis, if of sufficient amplitude and time, will likewise move the pawl 54 axially relative to the reel.

Thus, this invention provides a retractor responsive to both belt acceleration forces and acceleration pulses of predetermined amplitude and time.

I claim:

1. A seat belt retractor comprising, in combination, a support, a rotatable reel mounting a belt for extension and retraction relative thereto and including a pair of annular end plates having peripheral ratchet teeth aligned axially of the reel in respective pairs, means mounting the reel on the support for rotation about the axis thereof in belt extending and retracting directions and bodily movement through a predetermined distance in a plane containing such axis upon rotation of the reel by the belt at a rate exceeding a predetermined rate, means on the support engageable by an axially aligned pair of teeth of the reel to block rotation of the reel about the axis of rotation thereof upon bodily movement of the reel through the predetermined distance, a pawl mounted on the support for movement axially and radially of the reel in response to an acceleration pulse of predetermined amplitude and time directed generally normal to the direction of bodily movement of the reel, the pawl engaging an axially aligned pair of teeth of the reel upon movement thereof radially of the reel to block rotation of the reel and furnish a fulcrum for movement of the reel through the predetermined distance to engage the support means with another axially aligned pair of teeth of the reel, means for moving the pawl radially of the reel upon movement of the pawl axially of the reel and means locating the pawl axially and radially of the reel and resisting movement thereof.

2. A seat belt retractor comprising, in combination, a support, a reel mounting a belt for extension and retraction relative thereto, means mounting the reel on the support for rotation in belt extending and retracting directions and bodily movement through a predetermined distance relative to the support, a pawl, means slidably mounting the pawl on the support for movement in both radial and axial directions relative to said reel, cooperating means on the pawl and reel engageable with each other to block rotation of the reel about the axis of rotation thereof and furnish a fulcrum for movement of the reel through the predetermined distance, means normally locating the pawl in a position wherein the cooperating means are disengaged from each other, cooperating cam means on the pawl and support for moving the pawl relative to the support upon the pawl receiving an acceleration pulse of predetermined amplitude and time to engage the pawl and reel cooperating means, and cooperating means on the reel and support engageable with each other upon bodily movement of the reel through the predetermined distance.

3. The combination recited in claim 2 wherein the locating means for the pawl include cooperating surfaces on the pawl and support engageable with each other under a resilient bias to locate the pawl against movement axially and radially of the reel unless the required acceleration pulse is received.

4. The combination recited in claim 2 wherein the cooperating means include adjacent portions of the pawl extending generally radially of the reel and being of different radial extent, one portion being engageable with the reel upon movement of the pawl radially of the reel under an acceleration pulse applied to the pawl radially of the reel, and the other portion being engageable with the reel upon movement of the pawl axially and radially of the reel under an acceleration pulse directed generally axially of the reel.

5. A seat belt retractor comprising, in combination, a support including a pair of spaced walls provided with aligned elongated apertures having at least one closed end, a reel mounting a belt for extension and retraction relative thereto and including a shaft received in the apertures in engagement with the closed ends thereof to mount the reel on the support for rotation relative to the support in belt extending and retracting directions, the shaft moving bodily relative to the apertures and the reel moving bodily relative to the support upon rotation of the reel by the belt at a rate exceeding a predetermined rate, means responsive to an acceleration pulse of predetermined amplitude and time for blocking rotation of the reel relative to the support and furnishing a fulcrum for bodily movement of the reel relative to the support, and cooperating means on the reel and support engageable with each other to block movement of the reel relative to the support upon bodily movement of the reel through a predetermined distance.

6. A seat belt retractor comprising, in combination, a support including a pair of spaced walls provided with aligned elongated apertures having at least one closed end, a reel mounting a belt for extension and retraction relative thereto and including a shaft received in the apertures in engagement with the closed ends thereof to mount the reel on the support for rotation relative to the support in belt extending and retracting directions, the shaft moving bodily relative to the apertures and the reel moving bodily relative to the support upon rotation of the reel by the belt at a rate exceeding a predetermined rate, and pawl means mounted on the support and movable into engagement with the reel in response to an acceleration pulse of predetermined amplitude and time received thereby to block rotation of the reel relative to the support and furnish a fulcrum for bodily movement of the reel relative to the support, and cooperating means on the reel and support engageable with each other to block movement of the reel relative to the support upon bodily movement of the reel through a predetermined distance.

7. A seat belt retractor comprising, in combination, a support including a pair of spaced walls provided with aligned elongated apertures having at least one closed end, a reel mounting a belt for extension and retraction relative thereto and including a shaft received in the apertures in engagement with the closed ends thereof to mount the reel on the support for rotation relative to the support in belt extending and retracting directions, the shaft moving bodily relative to the apertures and the reel moving bodily relative to the support upon rotation of the reel by the belt at a rate exceeding a predetermined rate, a pawl seated on the support for movement relative thereto in response to an acceleration pulse of predetermined amplitude and time, cooperating means on the pawl and reel engageable with each other upon movement of the pawl to block rotation of the reel relative to the support and furnish a fulcrum for bodily movement of the reel relative to the support, means normally locating the pawl against movement relative to the support, and cooperating means on the reel and support engageable with each other to block movement of the reel relative to the support upon bodily movement of the reel through a predetermined distance.

8. A seat belt retractor comprising, in combination, a support, a reel mounting a belt extension and retraction relative thereto and including a pair of annular members having axially aligned ratchet teeth, means mounting the reel on the support for rotation in belt extending and retracting directions and bodily movement through a predetermined distance relative to the support, a pawl including spaced pairs of teeth, means movably mounting the pawl on the support with each pair of teeth thereof straddling a respective annular member, cooperating cam means on the pawl and support for moving the pawl relative to the support upon the pawl receiving an acceleration pulse of predetermined amplitude and time to engage one tooth of each pair with a tooth of a respective annular member and block rotation of the reel about the axis of rotation thereof to furnish a fulcrum for bodily movement of the reel through the predetermined distance, and cooperating means on the reel and support engageable with each other upon bodily movement of the reel through the predetermined distance.

* * * * *